United States Patent
Arunachalam et al.

(10) Patent No.: US 9,825,923 B2
(45) Date of Patent: Nov. 21, 2017

(54) SECURE RADIO INFORMATION TRANSFER OVER MOBILE RADIO BEARER

(71) Applicant: Nokia Solutions and Networks Oy, Espoo (FI)

(72) Inventors: Swaminathan Arunachalam, Plano, TX (US); Kabilan Thamilmani, Bangalore (IN); Mikko Tapani Suni, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 28 days.

(21) Appl. No.: 14/783,621

(22) PCT Filed: Apr. 12, 2013

(86) PCT No.: PCT/IB2013/052938
§ 371 (c)(1),
(2) Date: Oct. 9, 2015

(87) PCT Pub. No.: WO2014/167389
PCT Pub. Date: Oct. 16, 2014

(65) Prior Publication Data
US 2016/0087948 A1     Mar. 24, 2016

(51) Int. Cl.
*H04L 29/06*     (2006.01)
*H04L 9/32*     (2006.01)
(Continued)

(52) U.S. Cl.
CPC .......... *H04L 63/0435* (2013.01); *G06F 21/64* (2013.01); *H04L 9/0838* (2013.01);
(Continued)

(58) Field of Classification Search
CPC ...... H04L 9/3236; H04L 9/3242; G06F 21/64
See application file for complete search history.

(56) References Cited

U.S. PATENT DOCUMENTS

2002/0018569 A1* 2/2002 Panjwani .............. H04L 63/061
380/247
2002/0150066 A1* 10/2002 Schilling ................ H04B 1/707
370/335
(Continued)

FOREIGN PATENT DOCUMENTS

WO   WO 02/102009 A2   12/2002
WO   WO 2011/100331 A1   8/2011
WO   WO 2012/122994 A1   9/2012

OTHER PUBLICATIONS

Vallina-Rodriguez et al., "Header Enrichment or ISP Enrichment? Emerging Privacy Threats in Mobile Networks", 2015, pp. 25-30.*
(Continued)

*Primary Examiner* — Thaddeus Plecha
(74) *Attorney, Agent, or Firm* — Harrington & Smith

(57) ABSTRACT

Providing secure radio information transfer over a mobile radio bearer by generating one or more secret keys, applying symmetric encryption to unencrypted radio information to generate encrypted radio information, applying a keyed hash operation to the unencrypted radio information using the generated one or more secret keys to generate a message digest, and transmitting both the encrypted radio information and the message digest over a network.

23 Claims, 5 Drawing Sheets

(51) Int. Cl.
*G06F 21/64* (2013.01)
*H04L 9/08* (2006.01)
*H04W 12/02* (2009.01)
*H04W 12/10* (2009.01)
*H04W 12/04* (2009.01)

(52) U.S. Cl.
CPC ............ *H04L 9/3242* (2013.01); *H04L 63/00* (2013.01); *H04L 63/0492* (2013.01); *H04L 63/0876* (2013.01); *H04L 63/123* (2013.01); *H04W 12/02* (2013.01); *H04W 12/10* (2013.01); *H04L 9/3236* (2013.01); *H04W 12/04* (2013.01)

(56) References Cited

U.S. PATENT DOCUMENTS

| | | | |
|---|---|---|---|
| 2004/0117623 A1 | 6/2004 | Kalogridis et al. | 713/165 |
| 2005/0144457 A1* | 6/2005 | Lee | H04L 63/0428 713/176 |
| 2006/0236117 A1 | 10/2006 | Lazaridis et al. | |
| 2009/0100264 A1* | 4/2009 | Futa | H04L 9/0844 713/170 |
| 2009/0147678 A1* | 6/2009 | Xhafa | H04L 1/0002 370/232 |
| 2009/0204807 A1* | 8/2009 | Bolin | H04L 63/0428 713/155 |
| 2010/0318786 A1* | 12/2010 | Douceur | H04L 9/3247 713/155 |
| 2013/0145169 A1* | 6/2013 | Poovendran | H04L 9/3244 713/181 |
| 2013/0267202 A1* | 10/2013 | Palanigounder | H04L 12/1868 455/411 |
| 2014/0241305 A1* | 8/2014 | Basilier | H04W 76/021 370/329 |

OTHER PUBLICATIONS

3GPP TR 23.829 V10.0.1 (Oct. 2011), "3$^{rd}$ Generation Partnership Project; Technical specification Group Services and System Aspects; Local IP Access and Selected IP Traffic Offload (LIPA-SIPTO) (Release 10)", 43 pgs.

* cited by examiner

SECURE RADIO INFORMATION TRANSFER OVER MOBILE RADIO BEARER

TECHNICAL FIELD

The exemplary and non-limiting embodiments of this invention relate generally to wireless communications and, more specifically, to providing secure radio information transfer over a mobile radio bearer.

BACKGROUND

This section is intended to provide a background or context to the invention disclosed below. The description herein may include concepts that could be pursued, but are not necessarily ones that have been previously implemented, conceived, or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3DES triple data encryption standard
3GPP third generation partnership project
A2 sample receiving application
AES advanced encryption standard
APN access point name
BTS base transceiver station
CBC cipher-block chaining
CN core network
DL downlink
ECP extended cyclic prefix
E-UTRA evolved universal terrestrial radio access
eNB or eNodeB evolved node B/base station in an E-UTRAN system
EPC evolved packet core
EPS evolved packet system
E-UTRAN evolved UTRAN (LTE)
GGSN gateway GPRS support node
Gi interface to external packet data networks (Internet)
GPRS general packet radio service
HE header enrichment
HMAC hash-based message authentication code
ID identification, identifier
IP internet protocol
LTE long term evolution
LTE-A long term evolution advanced
MCS modulation and coding scheme
MD5 message digest algorithm
PDN packet data network
PDP packet data protocol
P-GW packet data network gateway
QoS quality of service
RACS radio application cloud server
RAN radio access network
RF radio frequency
RNC radio network controller
SGSN serving GPRS support node
S-GW serving gateway
SHA secure hash algorithm
SIPTO selected IP traffic offload
SMS short message service
TCP transport control protocol
TOF traffic offload
UE user equipment (e.g. mobile terminal)
UL uplink
UMTS universal mobile telecommunications system
UTRAN universal terrestrial radio access network In the wireless communications industry, traditional design philosophies are based upon building function-specific hardware platforms. This is in contrast to the field of computing where software applications are emphasized far more than the hardware used to run the applications. However, the wireless industry can no longer afford to build dedicated elements that serve singular functions and scale only as far as their allotted capacities. Moreover, conventional design approaches are based upon meeting worst-case scenarios. In practice, these approaches are rather inefficient. A network designed to meet the highest traffic demand during peak hours will have excess unused capacity throughout the remainder of the day.

SUMMARY

Pursuant to a first set of exemplary embodiments of the invention, a method comprises generating one or more secret keys, applying symmetric encryption to unencrypted radio information to generate encrypted radio information, applying a keyed hash operation to the unencrypted radio information using the generated one or more secret keys to generate a message digest, and transmitting both the encrypted radio information and the message digest over a network.

Pursuant to a set of further embodiments of the invention, one or more secret keys are generated by an administrator. Pursuant to a set of further embodiments of the invention, the one or more secret keys are generated by combining a private key of a sender and a public key of a recipient.

Pursuant to a second set of exemplary embodiments of the invention, a method comprises generating one or more secret keys, applying symmetric decryption to received encrypted radio information using the one or more secret keys to generate decrypted radio information, receiving a first message digest, applying a keyed hash operation to the decrypted radio information using the one or more secret keys to generate a second message digest, comparing the first and second message digests, and in response to the first digest being identical to the second digest, verifying that the decrypted radio information is valid.

According to another set of exemplary embodiments of the invention, an apparatus comprises at least one processor and a memory storing a set of computer instructions, in which the processor and the memory storing the computer instructions are configured to cause the apparatus to generate one or more secret keys. Symmetric encryption is applied to unencrypted radio information to generate encrypted radio information. A keyed hash operation is applied to the unencrypted radio information using the generated one or more secret keys to generate a message digest. The encrypted radio information and the message digest are both transmitted over a network.

According to another set of exemplary embodiments of the invention, an apparatus comprises at least one processor and a memory storing a set of computer instructions, in which the processor and the memory storing the computer instructions are configured to cause the apparatus to generate one or more secret keys. Symmetric decryption is applied to received encrypted radio information using the one or more secret keys to generate decrypted radio information. A first message digest is received. A keyed hash operation is applied to the decrypted radio information using the one or more secret keys to generate a second message digest. The first and second message digests are compared. In response to the first digest being identical to the second digest, the decrypted radio information is verified as being valid.

According to another set of exemplary embodiments of the invention, a non-transitory computer readable memory is encoded with a computer program comprising computer readable instructions recorded thereon for execution of a method comprising generating one or more secret keys, applying symmetric encryption to unencrypted radio information to generate encrypted radio information, applying a keyed hash operation to the unencrypted radio information using the generated one or more secret keys to generate a message digest, and transmitting both the encrypted radio information and the message digest over a network.

According to another set of exemplary embodiments of the invention, a non-transitory computer readable memory is encoded with a computer program comprising computer readable instructions recorded thereon for execution of a method comprising generating one or more secret keys, applying symmetric decryption to received encrypted radio information using the one or more secret keys to generate decrypted radio information, receiving a first message digest, applying a keyed hash operation to the decrypted radio information using the one or more secret keys to generate a second message digest, comparing the first and second message digests, and in response to the first digest being identical to the second digest, verifying that the decrypted radio information is valid.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
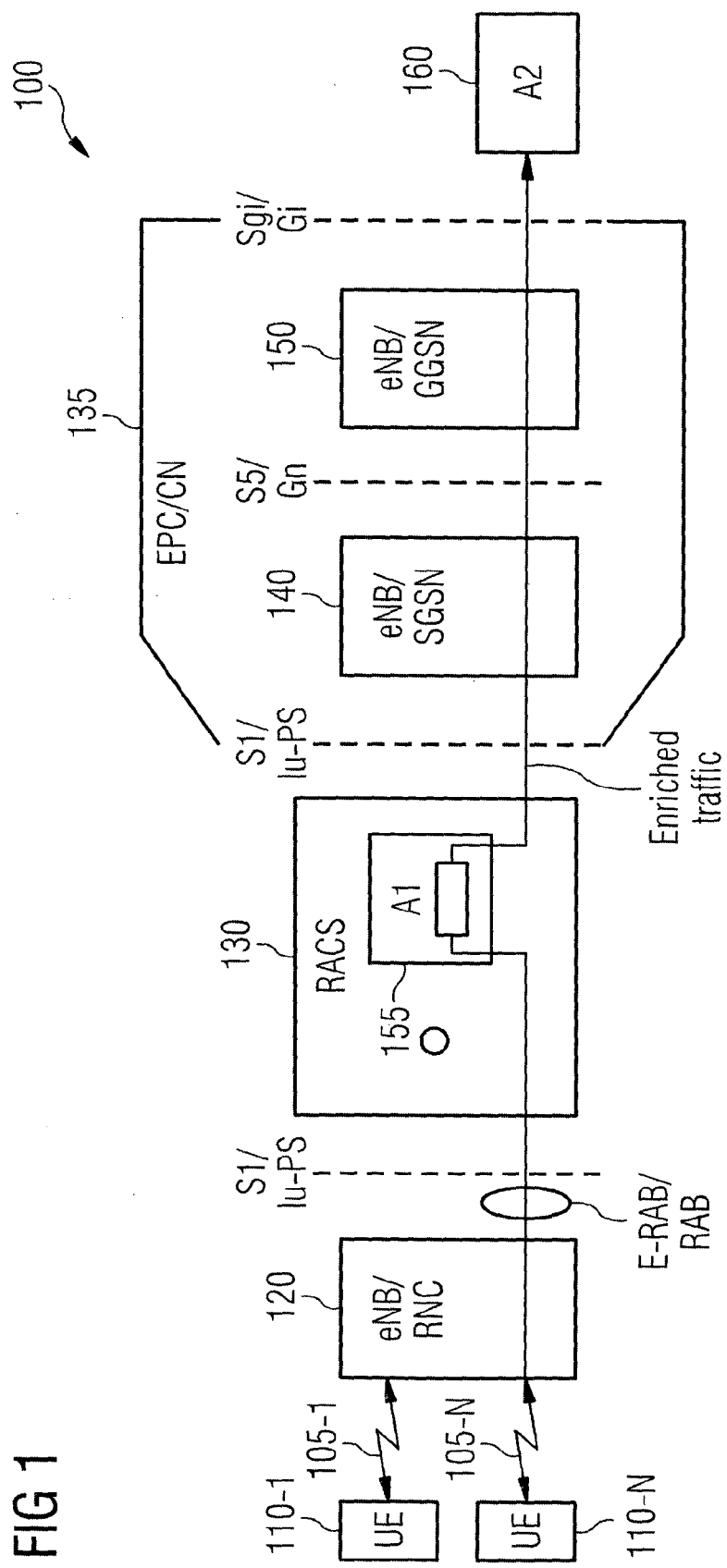
FIG. 1 illustrates a block diagram of an exemplary system in which the instant invention may be used.

A liquid network is a network that is configured for dynamically changing its capacity or purpose as different applications or functions are demanded. Liquid networks shift telecommunications infrastructure away from traditional design philosophies that emphasize a series of purpose-built boxes into a new philosophy in which the network itself becomes a set of applications built on common generic hardware platform. The wireless industry can no longer afford to build dedicated elements that serve singular functions and scale only as far as their maximum capacity will allow. Rather, a dynamic architecture is needed that allocates resources to the applications and functions demanded by the network at any given time or location. Each element, each function has to be able to sense not only the current load it faces, but also the overall health of the network at any given moment. It is highly inefficient to build a network based upon worst-case scenarios. A network designed to meet traffic demands during peak hours may have a substantial amount of unused capacity throughout the remainder of the day. Rather than build base stations and core gateways for these worst-case scenarios, it may be beneficial to provide the network with a set of 'liquid' resources which 'flow' to wherever these resources are needed, thus allowing operators to design their networks with a fraction of the capacity required under conventional approaches.

A liquid network may be implemented in conjunction with a liquid radio infrastructure designed to turn a traditional mobile network into software-driven network capable of self adapting to network loads. At present, large pools of excess capacity exist in many carrier networks because these networks are built to accommodate peak loads. A liquid radio infrastructure seeks to unfreeze capacity across the radio, core and transport levels. This infrastructure may be configured to enable the network understand the traffic that is moving across it. For example, a liquid radio access network (RAN) architecture incorporates the resource pooling principles laid out in the liquid network approach, removing baseband processing from cell sites and installing this processing in a radio applications cloud server (RACS). As cell sites become more and more congested, baseband resources-flow to the RACS. Baseband resources may continue moving from one RACS to another, following traffic demand through a wireless network.

Instead of replicating standardized hardware elements at every point in the network, liquid networks adopt flexible hardware platforms with application-agnostic processing resources. These flexible hardware platforms are configured to adjust their capacity or purpose in response to a current demand for applications or functions. Processing capacity may be pooled and re-allocated based on the application and location. On the radio side, baseband capacity may be pulled away from a particular cell site and used at another site. In the core, processing can be shared across browsing, VoIP and packet core functionalities. For instance, during a major sporting event, a soccer player achieving a game-changing goal may suddenly produce thousands of mobile requests for a single streamed replay of the goal. A core gateway serving the base stations near the sporting event may be configured to detect significant or critical plays made during the game. In response to detecting the game-changing goal, the core gateway transforms itself into a content delivery network, thereby caching the video near the edge of the network. In this manner, the network dynamically adapts itself to meet a significant but transient demand.

Illustratively, a liquid network may include radio base stations that uses distributed antennae and virtualized baseband processing to provide a highly distributed architecture built around small cells and miniature base-station designs. An evolved packet core (EPC) may be designed in accordance with a common Advanced Telecom Computing Architecture (ATCA). This ATCA platform may support the functions of the entire EPC, along with elements of the IP Multimedia Subsystem (IMS) service delivery network, policy management and specialized functions such as deep packet inspection and content delivery networks. The liquid network May be managed using an end-to-end network management system known as NetAct. NetAct is a self-aware, self-adapting platform that is equipped to reconfigure a liquid network to meet any of a wide variety of demand scenarios in real time.

Liquid networks may, but need not, be employed in connection with a universal terrestrial radio access network (UTRAN) or an evolved UTRAN (E-UTRAN). In the context of 3G, a radio access network (RAN) may be implemented using a base transceiver station (BTS) or a radio network controller (RNC). In the context of long term evolution (LTE), the RAN may be implemented using an evolved Node B (eNB). One or more RACS enable the deployment and hosting of local applications at RAN side in a virtualization computing environment by applying cloud technologies. A "leaky bearer" local breakout concept is applied to gain access to a mobile bearer's IP traffic flows.

LTE has been designed to support packet services in a more efficient manner than universal mobile telecommunications system (UMTS). One basic service, from a wireless data network perspective, is the establishment of a data session that will be used by the mobile device for data services. In UMTS and GPRS, the key to establishing a data session is the Packet Data Protocol (PDP) Context establishment procedure. In LTE, the procedure is somewhat different and is referred to as an Evolved Packet System (EPS) bearer setup.

There are some differences between the EPS bearer setup and the PDP context establishment procedure. In a UMTS network, the data session is established with a PDP Context Activation procedure. But before the PDP context can be established, a user equipment (UE) must perform an Attach procedure. The Attach procedure is used to alert a serving GPRS support node (SGSN) that the UE has powered up. One potential problem with this approach is that there is no action that the UE perform after an Attach without requesting a PDP Context. However, after an Attach, the UE is available to receive a short message service (SMS) message or a Network Initiated PDP Context. The issue is that it is not feasible to perform SMS messaging over a packet network and, in practice, network-initiated PDP context is not performed. Thus, after the Attach procedure is completed, the UE will perform a Primary PDP Context that will establish the data session and allocate an IP address to the UE. This PDP Context will have a quality of service (QoS) associated with it based on the needs specified in a request. If the UE needs to have multiple data sessions due to the existence of a plurality of different required QoS's, the UE will perform a secondary PDP Context activation. Note that there may be other reasons for establishing subsequent PDP Context beyond QoS.

In an LTE-based system, there are two types of data session setups. The first is called a Default EPS Bearer, and the second is called a Dedicated EPS Bearer. The Default EPS Bearer is established as part of the Attach procedure. The Default EPS Bearer will only support a nominal QoS, but that should be sufficient for application signaling. When the UE needs to establish a service, a Dedicated EPS Bearer will be established. This Dedicated EPS Bearer will have the QoS requirements needed for the service. By way of comparison, the LIE Attach/Default EPS Bearer is roughly equivalent to the UMTS Attach followed by a Primary PDP Context establishment procedure. The Secondary PDP Context Activation is similar to the Dedicated EPS Bearer Setup procedure. If one were to look at the key parameters in these messages, one would see that both the UMTS procedures and the LTE procedures still use parameters like an Access Point Name (APN), an IP address type, and QoS parameters. However, an optimization has been implemented in LTE that reduces the number of signaling Messages that need to be sent over the air.

Local breakout scenarios were studied in the third generation partnership project (3 GPP) as part of Release 10 under the name SIPTO (selected IP traffic offload). Results of these scenarios were documented in TR 23.829. One of the concepts is the so-called "leaky bearer" traffic flow break-out, also called TOF (Traffic offload). TOF allows extracting, modifying or inserting IP flows of an existing mobile bearer. This is a flexible break-out concept without involvement of or impact on the UE. TOF provides local access to mobile bearer traffic flows and enables the deployment and execution of applications at the RAN such as header enrichment, content delivery network (CDN) solutions, content delivery optimization, caching solutions, or others. These local applications may benefit from proximity to the radio (e.g., location awareness, lower latency), and by having access to radio information (e.g., radio cell load, location, UE's specific radio condition).

FIG. 1 illustrates a block diagram of an exemplary system in which the instant invention may be used. The system architecture shows N user equipments (UEs) 110-1 through 110-N communicating via a corresponding wireless connection 105-1 through 105-N (including uplink and downlink) to a network 100. The network 100 includes an evolved Node B (eNB)/RNC 120, an RACS 130, and an evolved packet core (EPC)/Core Network (CN) 135. The EPC/CN 135 includes a serving gateway (S-GW)/serving GPRS support node (SGSN) 140 and a packet data network gateway (P-GW)/gateway GPRS support node (GGSN) 150. Pursuant to an E-UTRAN embodiment, the eNB/RNC 120 is implemented as an eNB and the EPC/CN 135 is implemented as an EPC. The EPC/CN 135 includes the S-GW/SSGN 140 and the P-GW/GGSN 150. The S-GW/SGSN 140 is implemented as an S-GW, and the P-GW/GGSN 150 is implemented as a P-GW. E-UTRAN is also called long term evolution (LTE).

Pursuant to a UTRAN embodiment, the eNB/RNC 120 is implemented as an RNC, and the EPC/CN 135 is implemented as a CN. The EPC/CN 135 includes the S-GW/SSGN 140 and the P-GW/GGSN 150. The S-GW/SGSN 140 is implemented as an SGSN, and the P-GW/GGSN 150 is implemented as a GGSN. The foregoing E-UTRAN and UTRAN examples indicate some possible elements within the network 100 but are not exhaustive, nor are the shown elements necessary for the particular embodiments. Furthermore, the instant invention may be used in other systems, such as CDMA (code division multiple access) and LTE-A (LTE-advanced).

When the "leaky bearer" concept is applied to either the E-UTRAN embodiment or the UTRAN embodiment of the network 100, the RACS 130 functions as an offload node that is placed between the eNB/RNC 120 and the EPC/CN 135 on an Si interface (E-UTRAN) or an Iu-PS interface (UTRAN). The RACS 130 functions as an offload node that "drills" into E-UTRAN radio access bearers (E-RAB) or UTRAN radio access bearers (RAB). The E-RAB transports the packets of the EPS bearer (discussed previously) between the UE 110-1 and the EPC/CN 135. When an E-RAB exists, there is a one-to-one mapping between this E-RAB and an EPS bearer. A data radio bearer transports the packets of the EPS bearer between the UE 110-1 and the eNB/RNC 120. When a data radio bearer exists, there is a one-to-one mapping between this data radio bearer and the EPS bearer/E-RAB. In the E-UTRAN embodiment of network 100, an Si bearer transports the packets of an E-RAB between the eNB/RNC 120 and the S-GW/SGSN 140.

Pursuant to a set of illustrative embodiments of the present invention, a modified pass-through application is performed where an application A1 155 residing in the RACS 130 node modifies uplink traffic by "enriching" it. This application A1 155 may be configured to perform a procedure called "Header Enrichment" (HE). HE conveys radio condition information to applications located in the EPC/CN 135. Examples of possible radio information include, but are not limited to, a Cell ID indicator, a'Cell Load indicator, a Radio Link Quality indicator, or bandwidth guidance. This information may be transferred "in-band" within a mobile bearer as part of an options field of TCP headers of applicable IP flows flowing from the UE 110-1 towards the EPC/CN 135. A sample receiving application A2 160 is a content optimizer which can use the received radio information to improve its algorithms. According to a further set of illustrative embodiments of the present invention, cryptography techniques may be employed to ensure integrity, authenticity, and confidentiality of the information added by the HE process.

Transfer of radio information to applications (in the EPC/CN 135 and beyond) raises several issues and concerns. Some of the transferred information may be operator-sensitive or business-sensitive or both. How is it possible to ensure that radio information can only be processed by authorized applications? When radio information is transferred to applications, it would be desirable to confirm that the information was not tampered with by unauthorized software or equipment during the transfer. For example, malicious software code within an operator's EPC/CN 135 may modify the radio information. Ideally, only operator-authorized applications as well as operator-provided Lawful Interception Gateways should be able to process the transferred radio information. In the illustrative embodiment of FIG. 1, a lawful interception point may be located between applications A1 155 and A2 160, illustratively as integrated function of the P-GW/GGSN 150, or on a Gi interface between the P-GW/GGSN 150 and application A2 160.

Another issue with respect to the transfer of radio information is how to confirm that the radio information was, indeed, generated by the application A1 155 in the RACS 130. Due to the fact that the transfer of radio information is performed in-band, a malicious user equipment may attempt to transfer invalid radio information. From a lawful interception/regulation perspective, it is necessary to differentiate between data sent by a user and data modified by a network. It would be desirable to address all of the foregoing issues without requiring separate signaling/control plane mechanisms to convey the radio information to the application A2 160.

Figure 2:
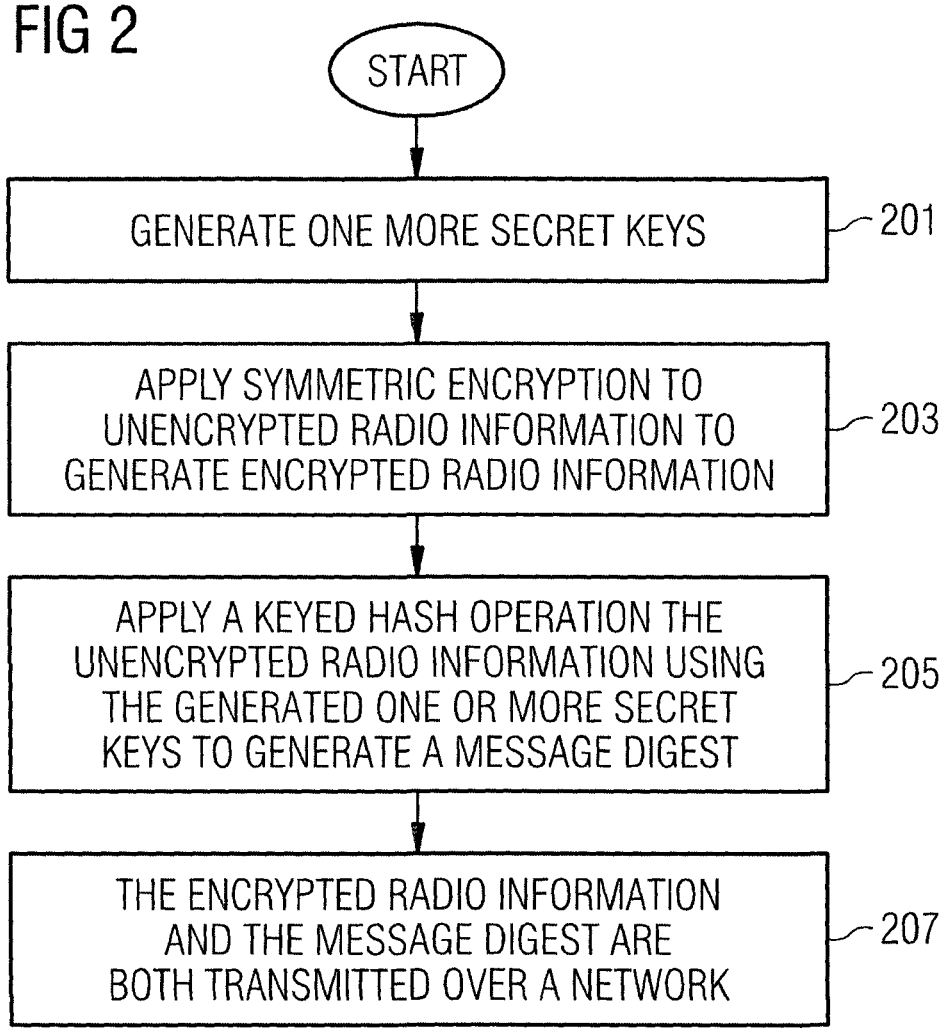
FIG. 2 is a flowchart illustrating a first method, and a result of execution by one or more processors of a set of computer program instructions embodied on a computer readable memory, for providing secure radio information transfer over a mobile radio bearer in accordance with a set of exemplary embodiments of the invention.

FIG. 2 is a flowchart illustrating a first method, and a result of execution by one or more processors of a set of computer program instructions embodied on a computer readable memory, for providing secure radio information transfer over a mobile radio bearer in accordance with a set of exemplary embodiments of the invention. It is noted that the order of steps shown in FIG. 2 is not absolutely required, so in principle, the various steps may be performed out of the illustrated order. Also, certain steps may be skipped, different steps may be added or substituted, or selected steps or groups of steps may be performed in a separate application.

The operational sequence of FIG. 2 commences at block 201 where one or more secret keys are generated. These one or more secret keys may, but need not, be generated by an administrator. These one or more secret keys may, but need not, be generated by combining a private key of a sender and a public key of a recipient. Next, at block 203, symmetric encryption is applied to unencrypted radio information to generate encrypted radio information. The operational sequence progresses to block 205 where a keyed hash operation is applied to the unencrypted radio information using the generated one or more secret keys to generate a message digest. At block 207, the encrypted radio information and the message digest are both transmitted over a network such as network 100 (FIG. 1).

Figure 3:
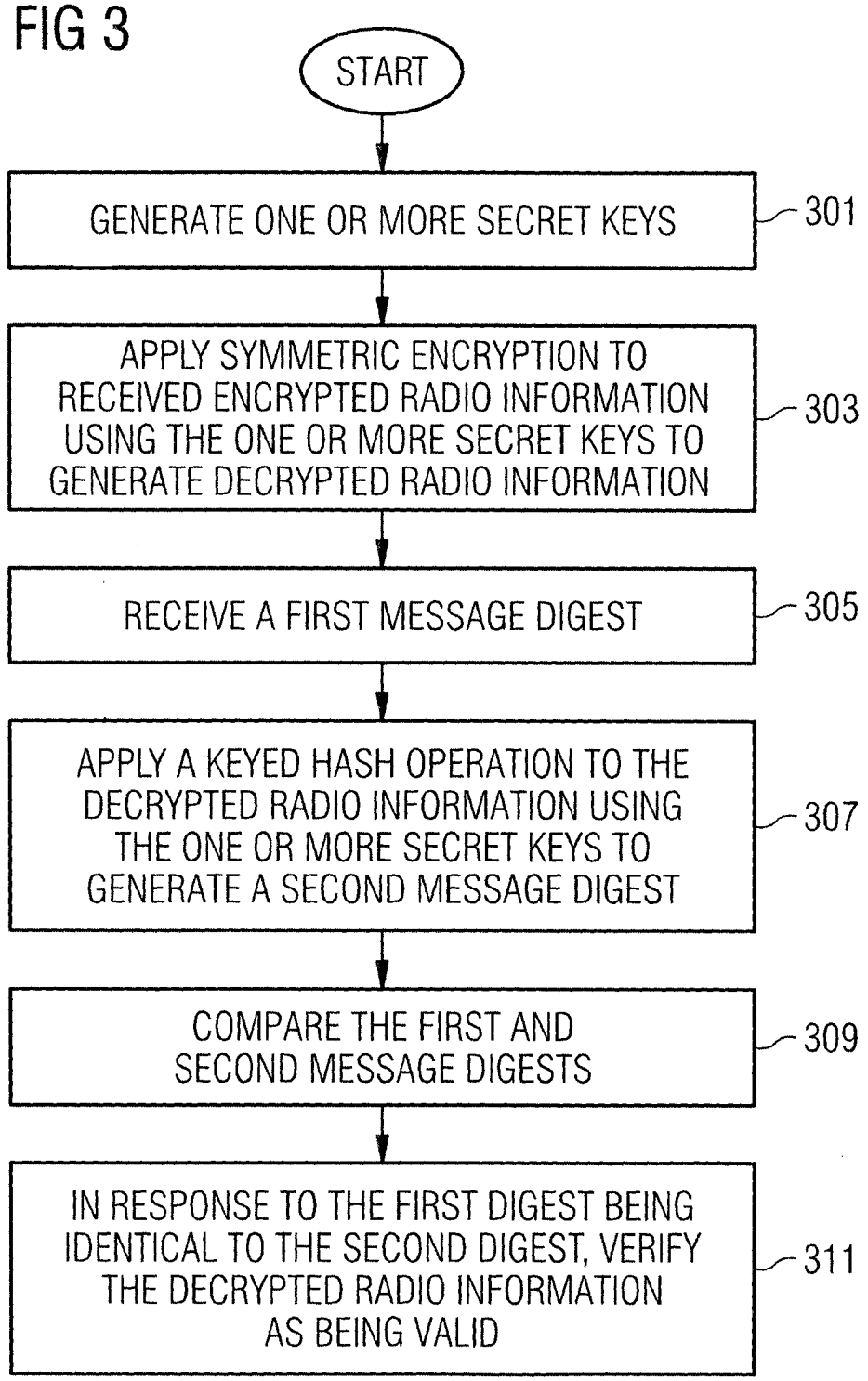
FIG. 3 is a flowchart illustrating a second method, and a result of execution by one or more processors of a set of computer program instructions embodied on a computer readable memory, for providing secure radio information transfer over a mobile radio bearer in accordance with a set of exemplary embodiments of the invention.

FIG. 3 is a flowchart illustrating a second method, and a result of execution by one or more processors of a set of computer program instructions embodied on a computer readable memory, for providing secure radio information transfer over a mobile radio bearer in accordance with a set of exemplary embodiments of the invention. It is noted that the order of steps shown in FIG. 3 is not absolutely required, so in principle, the various steps may be performed out of the illustrated order. Also, certain steps may be skipped, different steps may be added or substituted, or selected steps or groups of steps may be performed in a separate application.

The operational sequence of FIG. 3 commences at block 301 where one or more secret keys are generated. These one or more secret keys may, but need not, be generated by an administrator. These one or more secret keys may, but need not, be generated by combining a private key of a sender and a public key of a recipient. Next, at block 303, symmetric decryption is applied to received encrypted radio information using the one or more secret keys to generate decrypted radio information. The operational sequence progresses to block 305 where a first message digest is received. A keyed hash operation is applied to the decrypted radio information using the one or more secret keys to generate a second message digest (block 307). The first and second message digests are compared (block 309). In response to the first digest being identical to the second digest, the decrypted radio information is verified as being valid (block 311).

The methods described in connection with FIGS. 2 and 3 provide confidentiality, integrity, and authenticity. Confidentiality is provided in the sense that transferred radio, information is protected from unauthorized processing due to the information being encrypted. Thus, only authorized receivers will possess the required secret keys. Integrity is provided due to the fact that the transferred radio information is protected from tampering. A receiver can easily confirm that the received information has been tampered with or determined to be invalid and reject such information. Authenticity is provided in the sense that a receiver of radio information may confirm that the information was sent by valid sender. Only authorized senders will possess the required secret keys.

Symmetric encryption/decryption algorithms may be used in conjunction with either or both of the methods of FIGS. 2 and 3. These symmetric encryption/decryption algorithms may, but need not, include any of triple data encryption standard (3DES), advanced encryption standard (AES), or Two fish. These symmetric encryption/decryption algorithms may, but need not, provide a cipher mode of operation such as cipher block chaining (CBC). The selection of algorithm, cipher mode operation and key lengths may, but need not, be configurable. Either or both of the methods of FIGS. 2 and 3 may, but need not, utilize message authentication code algorithms such as hash-based message authentication code (HMAC)-message digest algorithm (MD5), or I-MAC-secure hash algorithm (SHA). The selection of algorithm and key lengths may, but need not, be configurable.

While sending the encrypted information and the message digest, the operational sequences of FIGS. 2 and 3 may consider the maximum space and available space in any of the various components of the network 100 (FIG. 1) to make adjustments as follows. For example, if a transport control protocol (TCP) options header has a maximum 40-byte space available, other use cases or applications may be utilizing a portion of this 40-byte space, so the actual available space may be less than 40 bytes. Since the minimum block size of most symmetric encryption/decryption algorithms is 8 bytes, then the minimum information size is 8 bytes. Likewise, since the minimum block size of message authentication code algorithms is 16 bytes, then the minimum message digest size is 16 bytes. The foregoing limitations imply that a minimum of 24 bytes (8+16) are required for the transfer of radio information.

Figure 4:
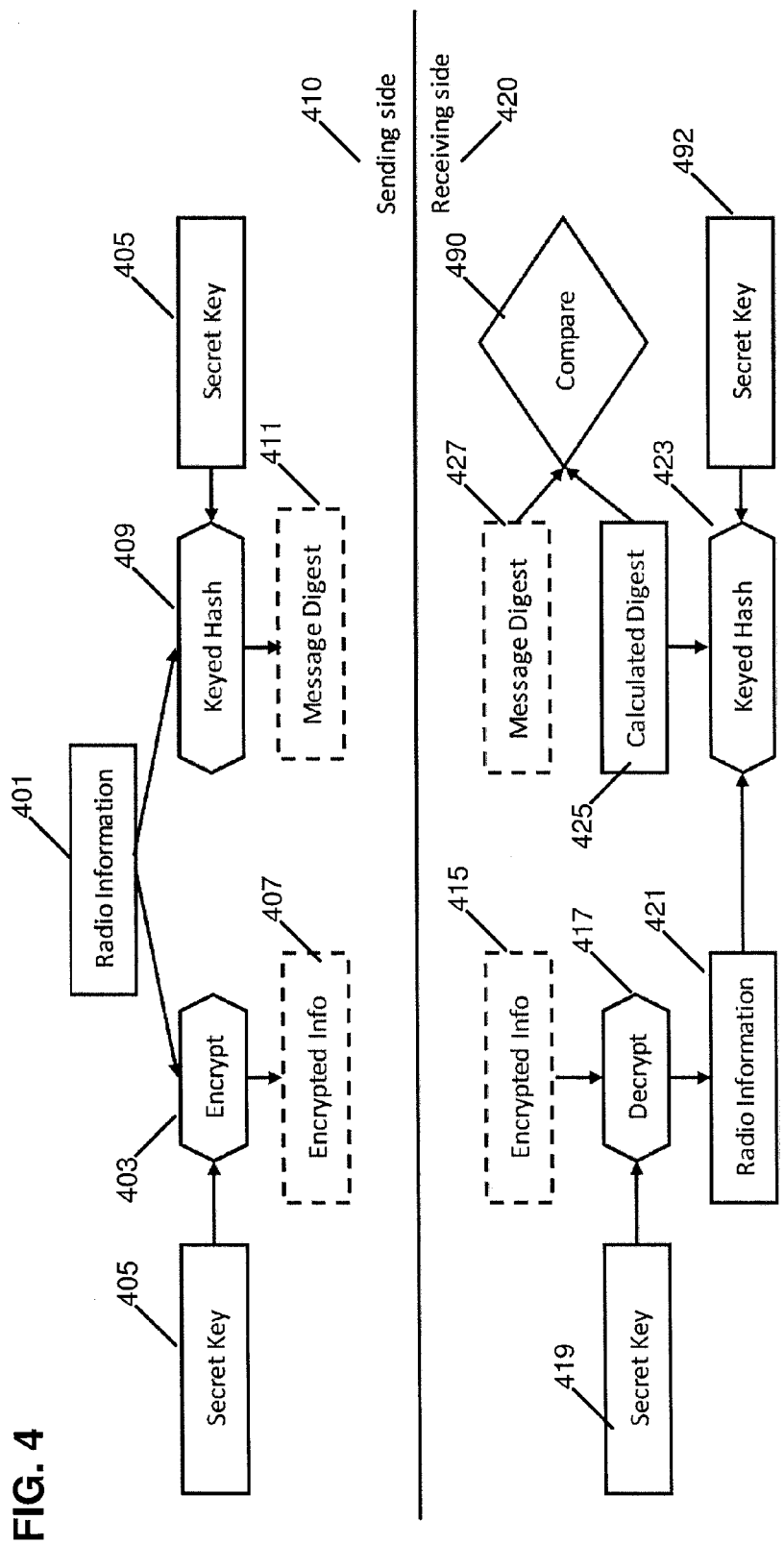
FIG. 4 is a flowchart illustrating a third method, and a result of execution by one or more processors of a set of computer program instructions embodied on a computer readable memory, for sending and receiving radio information in accordance with a set of exemplary embodiments of the invention.

FIG. 4 is a flowchart illustrating a third method, and a result of execution by one or more processors of a set of computer program instructions embodied on a computer readable memory, for sending and receiving radio information in accordance with a set of exemplary embodiments of the invention. It is noted that the order of steps shown in FIG. 4 is not absolutely required, so in principle, the various steps may be performed out of the illustrated order. Also, certain steps may be skipped, different steps may be added or substituted, or selected steps or groups of steps may be performed in a separate application.

With reference to FIG. 4, on a sending side 410, radio information 401 is encrypted 403 using a secret key 405 to generate encrypted information 407. A keyed hash 409 is applied to the radio information 401 using the secret key 405 to generate a message digest 411. At the receiving side 420, encrypted information 415 is received and decrypted 417 using a secret key 419 to generate radio information 421. A keyed hash 423 is applied, using the secret key 492, to the generated radio information 421 to generate a calculated digest 425. The calculated digest 425 is compared 490 to a received message digest 427.

Figure 5:
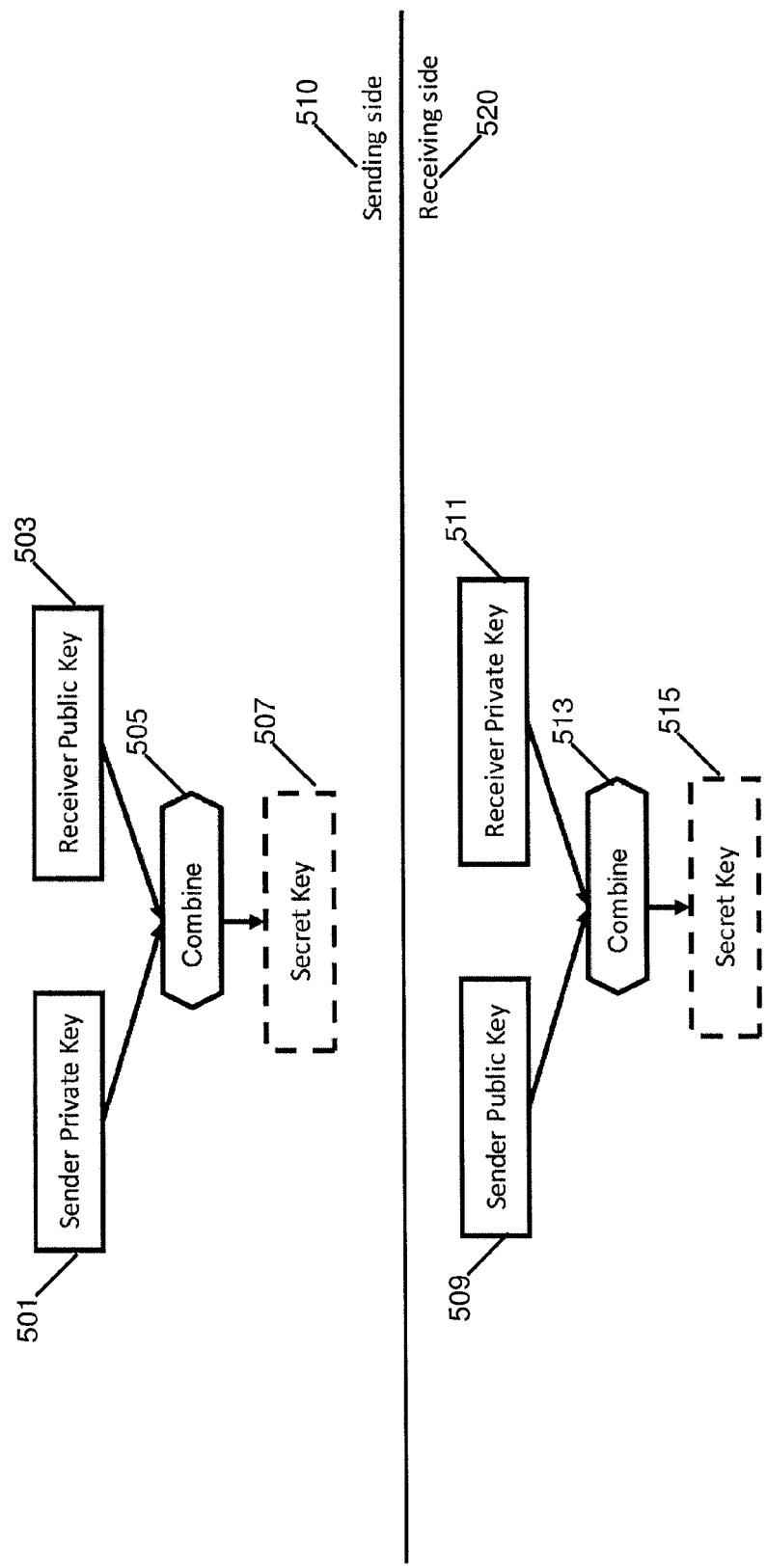
FIG. 5 is a flowchart illustrating a fourth method, and a result of execution by one or more processors of a set of computer program instructions embodied on a computer readable memory, by which a sender and a receiver can create a common secret key without any online communication in accordance with a set of exemplary embodiments of the invention.

FIG. 5 is a flowchart illustrating a fourth method, and a result of execution by one or more processors of a set of computer program instructions embodied on a computer readable memory, by which a sender and a receiver can create a common secret key without any online communication in accordance with a set of exemplary embodiments of the invention. It is noted that the order of steps shown in FIG. 5 is not absolutely required, so in principle, the various steps may be performed out of the illustrated order. Also, certain steps may be skipped, different steps may be added or substituted, or selected steps or groups of steps may be performed in a separate application.

With reference to FIG. 5, on a sending side 510, a sender private key 501 and a receiver public key 503 are combined 505 to generate a secret key 507. On a receiving side 520, a sender public key 509 and a receiver private key 511 are combined 513 to generate a secret key 515. Note that the sender and the receiver need to possess the other party's public key. With regard to key management, a sender may support multiple receivers (& vice versa). Administrative support may be provided for the secret keys. Alternatively or additionally, the secret keys may be derived by combining a private key of a sender and a public key of a recipient. The sender may be configured to send different sets of information to different receivers.

With regard to algorithm selection, the sender and the receiver may be configured to support different cryptography algorithms. The sender may check available space for in-band communication and perform sending of radio information only if space is available perform these operations. The sender and the receiver may be configured to support selected security mechanisms such as confidentiality (encryption), integrity, and authenticity (keyed hash). From time to time, adjustments may be performed with regard to packet flow. The sender may be configured to identify one or more flows of traffic to which the radio information is required to be transferred (e.g. identify packets that correspond to traffic initiation and those that follow). Based on that identification, the sender may be configured to transfer the radio information more or less frequently. For example, the sender may be configured to send the radio information in 'x' initial packets of a traffic flow and then in every nth packet after that.

It is noted that various non-limiting embodiments described herein may be used separately, combined or selectively combined for specific applications. Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

We claim:

1. A method comprising:
for an in-band communication within a mobile bearer used for communication of data from a user equipment towards a core network of a mobile network, performing by a network element header enrichment of part of headers of packets of the data of one or more applicable flows for the communication flowing from the user equipment towards the core network, wherein the header enrichment comprises performing at least the following:
receiving, at the network element and from the user equipment, the packets of the data of the one or more applicable flows for the communication flowing from the user equipment towards the core network,
generating one or more secret keys,
applying symmetric encryption to unencrypted radio information to generate encrypted radio information, wherein the radio information concerns information corresponding to a radio used to communicate with the user equipment,
applying a keyed hash operation to the unencrypted radio information using the generated one or more secret keys to generate a message digest,
enriching the packets using the part of the headers of the packets and the one or more applicable flows at least by inserting both the encrypted radio information and the message digest in the part of the headers of the packets, wherein the encryption of the radio information and the message digest authenticate that the radio information was sent from a valid sender, and transmitting by the network element the enriched packets over the mobile network toward the core network.

2. The method of claim 1 wherein the one or more secret keys are generated by an administrator.

3. The method of claim 1 wherein the one or more secret keys are generated by combining a private key of a sender and a public key of a recipient.

4. The method of claim 1 wherein the transmitting is performed only in response to determining that available spectrum space exists for the in-band communication.

5. The method of claim 1 further comprising identifying the one or more applicable flows of traffic on which the radio information is to be transmitted and adjusting a frequency of packet transmission in response to the identified one or more applicable flows of traffic.

6. A method comprising:
receiving packets from a user equipment, where the packets have been enriched by a network element using part of headers of the packets and one or more applicable flows at least by insertion of both encrypted radio information and a first message digest in the part of the headers of the packets, wherein the radio information concerns information corresponding to a radio used to communicate with the user equipment,
removing both the encrypted radio information and the first message digest in the part of the headers of the packet,
generating one or more secret keys,
applying symmetric decryption to the received encrypted radio information using the one or more secret keys to generate decrypted radio information,
applying a keyed hash operation to the decrypted radio information using the one or more secret keys to generate a second message digest,
comparing the first and second message digests,
in response to the first digest being identical to the second digest, verifying that the decrypted radio information is from a valid sender, and
using the decrypted radio information in response to verifying that the decrypted radio information is from the valid sender.

7. The method of claim 6 wherein the one or more secret keys are generated by an administrator.

8. The method of claim 6 wherein the one or more secret keys are generated by combining a public key of a sender and a private key of a recipient.

9. The method of claim 6 wherein the symmetric decryption includes any of triple data encryption standard, advanced encryption standard, or Twofish.

10. An apparatus comprising at least one processor and a memory storing a set of computer instructions, in which the at least one processor and the memory storing the computer instructions are configured to cause the apparatus to:
for an in-band communication within a mobile bearer used for communication of data from a user equipment towards a core network of a mobile network, perform by a network element header enrichment of part of headers of packets of the data of one or more applicable flows for the communication flowing from the user equipment towards the core network, wherein the header enrichment comprises performing at least the following:
receiving, at the network element and from the user equipment, the packets of the data of the one or more applicable flows for the communication flowing from the user equipment towards the core network,
generating one or more secret keys,
applying symmetric encryption to unencrypted radio information to generate encrypted radio information, wherein the radio information concerns information corresponding to a radio used to communicate with the user equipment,
applying a keyed hash operation to the unencrypted radio information using the generated one or more secret keys to generate a message digest,
enriching the packets using the part of the headers of the packets and the one or more applicable flows at least by inserting both the encrypted radio information and the message digest in the part of the headers of the packets, wherein the encryption of the radio information and the message digest authenticate that the radio information was sent from a valid sender, and
transmitting by the network element the enriched packets over the mobile network toward the core network.

11. The apparatus of claim 10 wherein the one or more secret keys are generated by an administrator.

12. The apparatus of claim 10 wherein the one or more secret keys are generated by combining a private key of a sender and a public key of a recipient.

13. The apparatus of claim 10 wherein the transmitting is performed only in response to determining that available spectrum space exists for the in-band communication.

14. The apparatus of claim 10 further comprising identifying the one or more applicable flows of traffic on which the radio information is to be transmitted and adjusting a frequency of packet transmission in response to the identified one or more applicable flows of traffic.

15. An apparatus comprising at least one processor and a memory storing a set of computer instructions, in which the at least one processor and the memory storing the computer instructions are configured to cause the apparatus to:
receive packets from a user equipment, where the packets have been enriched by a network element using part of headers of the packets and one or more applicable flows at least by insertion of both encrypted radio information and a first message digest in the part of the headers of the packets, wherein the radio information concerns information corresponding to a radio used to communicate with the user equipment,
remove both the encrypted radio information and the first message digest in the part of the headers of the packet,
generate one or more secret keys,
apply symmetric decryption to the received encrypted radio information using the one or more secret keys to generate decrypted radio information,
apply a keyed hash operation to the decrypted radio information using the one or more secret keys to generate a second message digest,
compare the first and second message digests,
in response to the first digest being identical to the second digest, verify the decrypted radio information as being from a valid sender, and
use the decrypted radio information in response to verifying that the decrypted radio information is from the valid sender.

16. The apparatus of claim 15 wherein the one or more secret keys are generated by an administrator.

17. The apparatus of claim 15 wherein the one or more secret keys are generated by combining a public key of a sender and a private key of a recipient.

18. The apparatus of claim 15 wherein the symmetric decryption includes any of triple data encryption standard, advanced encryption standard, or Twofish.

19. A non-transitory computer readable memory encoded with a computer program comprising computer readable instructions recorded thereon for execution of a method comprising:
- for an in-band communication within a mobile bearer used for communication of data from a user equipment towards a core network of a mobile network, performing by a network element header enrichment of part of headers of packets of the data of one or more applicable flows for the communication flowing from the user equipment towards the core network, wherein the header enrichment comprises performing at least the following:
- receiving, at the network element and from the user equipment, the packets of the data of the one or more applicable flows for the communication flowing from the user equipment towards the core network,
- generating one or more secret keys,
- applying symmetric encryption to unencrypted radio information to generate encrypted radio information, wherein the radio information concerns information corresponding to a radio used to communicate with the user equipment,
- applying a keyed hash operation to the unencrypted radio information using the generated one or more secret keys to generate a message digest,
- enriching the packets using the part of the headers of the packets and the one or more applicable flows at least by inserting both the encrypted radio information and the message digest in the part of the headers of the packets, wherein the encryption of the radio information and the message digest authenticate that the radio information was sent from a valid sender, and
- transmitting by the network element the enriched packets over the mobile network toward the core network.

20. The non-transitory computer readable memory of claim 19 further comprising instructions for generating the one or more secret keys by combining a private key of a sender and a public key of a recipient.

21. The non-transitory computer readable memory of claim 19 further comprising instructions for performing the transmitting only in response to determining that available spectrum space exists for the in-band communication.

22. The non-transitory computer readable memory of claim 19 further comprising instructions for identifying the one or more applicable flows of traffic on which the radio information is to be transmitted and adjusting a frequency of packet transmission in response to the identified one or more applicable flows of traffic.

23. A non-transitory computer readable memory encoded with a computer program comprising computer readable instructions recorded thereon for execution of a method comprising:
- receiving packets from a user equipment, where the packets have been enriched by a network element using part of headers of the packets and one or more applicable flows at least by insertion of both encrypted radio information and a first message digest in the part of the headers of the packets, wherein the radio information concerns information corresponding to a radio used to communicate with the user equipment,
- removing both the encrypted radio information and the first message digest in the part of the headers of the packet,
- generating one or more secret keys,
- applying symmetric decryption to the received encrypted radio information using the one or more secret keys to generate decrypted radio information,
- applying a keyed hash operation to the decrypted radio information using the one or more secret keys to generate a second message digest,
- comparing the first and second message digests,
- in response to the first digest being identical to the second digest, verifying that the decrypted radio information is from a valid sender, and
- using the decrypted radio information in response to verifying that the decrypted radio information is from the valid sender.

* * * * *